United States Patent
Niemeyer et al.

(10) Patent No.: US 8,190,292 B2
(45) Date of Patent: May 29, 2012

(54) HIGH FREQUENCY FEEDBACK IN TELEROBOTICS

(75) Inventors: Gunter Niemeyer, Mountain View, CA (US); Neal A. Tanner, Burnet, TX (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 1021 days.

(21) Appl. No.: 11/512,759

(22) Filed: Aug. 29, 2006

(65) Prior Publication Data
US 2007/0052496 A1    Mar. 8, 2007

Related U.S. Application Data

(60) Provisional application No. 60/712,355, filed on Aug. 29, 2005.

(51) Int. Cl.
*G06F 19/00* (2011.01)
*G05B 19/18* (2006.01)
(52) U.S. Cl. .............. 700/245; 700/2; 700/3; 700/45; 700/249; 709/208; 709/209
(58) Field of Classification Search .............. 709/208; 700/245
See application file for complete search history.

(56) References Cited

U.S. PATENT DOCUMENTS

| | | | | |
|---|---|---|---|---|
| 4,925,312 A | * | 5/1990 | Onaga et al. | 700/261 |
| 5,266,875 A | | 11/1993 | Slotine et al. | |
| 6,144,884 A | * | 11/2000 | Niemeyer et al. | 700/3 |
| 6,847,852 B2 | * | 1/2005 | Hennion | 700/45 |
| 2007/0112465 A1 | * | 5/2007 | Sadighi et al. | 700/254 |

OTHER PUBLICATIONS

Niemeyer, Gunter et al. "Telemanipulation With Time Delay" (2004) The International Journal of Robotics Research, vol. 23, No. 9, pp. 873-890.
Daniel, R.W. et al. "Fundamental limits of Performance for Force Reflecting Teleoperation" (1998) The International Journal of Robotic Research, vol. 17, No. 8, pp. 811-830.
Hashtrudi-Zaad, Keyvan et al. "Transparency in Time-Delayed Systems and the Effect of Local Force Feedback for Transparent Teleoperation" (2002) IEEE Transaction on Robotics and Automation, vol. 18, No. 1 pp. 108-114.
Munir, Saghir et al. "Internet-Based Teleoperation Using Wave Variables With Prediction" (2002) IEEE/ASME Transactions on Mechatronics, vol. 7, No. 2, pp. 124-133.

* cited by examiner

*Primary Examiner* — Edward Tso
*Assistant Examiner* — Johali Torres Ruiz
(74) *Attorney, Agent, or Firm* — Lumen Patent Firm (57) ABSTRACT

Telerobotic systems with integrated high frequency feedback to enhance users' telerobotic experience are provided. The controller of the telerobotic system is characterized by combining high frequency information with low frequency position or velocity information. The controller is useful for tele-operations with delay and no-delay between the communication channels of the master and slave device.

5 Claims, 6 Drawing Sheets

HIGH FREQUENCY FEEDBACK IN TELEROBOTICS

CROSS-REFERENCE TO RELATED APPLICATIONS

This application is cross-referenced to and claims the benefit from U.S. Provisional Patent Application 60/712,355 filed Aug. 29, 2005, which is hereby incorporated by reference in its entirety for all that it discloses.

FIELD OF THE INVENTION

The invention relates generally to telerobotics. More particularly, the invention relates to feedback control devices and methods in telerobotic systems.

BACKGROUND

Telerobotics allows users to indirectly manipulate and interact with environments via master and slave robotic mechanisms. It enables operation at a distance and can also scale human forces and motions to achieve stronger, larger, or smaller interfaces. Applications range from space exploration to minimally invasive surgery. Vision is typically the dominant feedback modality in these systems, but the addition of haptic feedback provides more complete information to the user and can improve their ability to perform complex tasks.

High frequency feedback to a user is commonly recognized as vital to achieving a realistic telerobotic experience. However, high frequency feedback continues to be a challenge for most telerobotic systems. Difficulties such as contact instabilities have led researchers to sidestep stability issues using alternate modalities such as audio and vibrotactile displays.

Among the force feedback architectures, one could distinguish two existing philosophies. First, position-position approaches use slave tracking errors to feed back computed forces. Typically, they connect master and slave with a single PD controller imitating a spring and damper. This method is passive and provides robust stability without any knowledge of the environment. Furthermore, in this approach the critical high frequency forces are masked out of the feedback and the operator experiences a soft, compliant feel.

Realizing that human perception peaks at several hundred Hertz, the opposing philosophy utilizes a position-force architecture. It feeds measured contact forces directly back to the user, with high frequency signals intact. This violates passivity by hiding the slave's inertia and often has limited stability, especially in contact with stiff environments. Though researchers have tried to improve stability margins, these systems are fundamentally sensitive to lag and delays.

The presence of even small time delays, typically found in the communication channel between the master and slave sites, poses a serious stability problem for force feedback telerobots. Most delay capable controllers ultimately achieve stability through prediction across the delay and/or by severely restricting the bandwidth of the system. Prediction of interactions with a truly unknown environment itself proves problematic. Limiting the system bandwidth deprives the user of very important high frequency feedback information. Even wave variable controllers with guaranteed stability focus on low frequency interactions. For a description of wave variable controllers the reader is referred to Niemeyer et al. (Niemeyer G and Slotine J J E (2004), a paper entitled "*Telemanipulation with time delays*" and published in the International Journal of Robotics Research 23(9):873-890).

Accordingly, there is a need in the art to develop new methods and systems to overcome the shortcomings in the art and integrate high frequency feedback in telerobotic systems to enhance users' telerobotic experience.

SUMMARY OF THE INVENTION

The present invention provides telerobotic systems with integrated high frequency feedback to enhance users' telerobotic experience. In one embodiment the invention is a telerobotic system including a master, a slave and a wave controller interfacing the master and slave device. The wave controller is characterized by receiving position or velocity information from the slave and encoding position or velocity information in a wave transformation. The encoded position or velocity information is then decoded for feedback to the master. The position or velocity information received from the slave device is low frequency information, and in a preferred example this information has a frequency content up to about 10 Hz.

The wave controller further receives force or acceleration information from the slave. The received force or acceleration information is used to extract and shape high frequency force or acceleration information, which in one example is defined as matching the acceleration between the master and the slave device in the high frequency range. The extracted and shaped high frequency information is then combined with either the encoded or the decoded position or velocity information. The high frequency information has a frequency content of about 10 Hz or higher or of about 10 Hz to about 1 Khz.

A wave filter could be used to shape or cancel wave reflections in the wave controller. The invention provides two types of wave filters, i.e. a infinite horizon and finite horizon wave shaping filter.

In another embodiment, the invention is a telerobotic system including a master, a slave and a controller interfacing the master and the slave device. In this system, the controller is characterized by providing a first feedback force to the master device and a second force feedback to the slave device. The first feedback force has a component being dependent on one of the velocities of the master device or the slave device, or a combination of both velocities. The second feedback force has a component being dependent on one of the velocities of the master device or the slave device, or a combination of both velocities. A key aspect of this controller is that the first feedback force and the second feedback force together do not dissipate or generate power in the master device and the slave device. This particular controller is also characterized by having gyroscopic forces with an asymmetry between the gain of the master velocity to the slave force and the gain of the slave velocity to the master force.

The telerobotic systems with high frequency feedback are useful for teleoperations with delay as well as with no-delay between the communication channels of the master and slave device, while maintaining contact stability.

BRIEF DESCRIPTION OF THE FIGURES

The objectives and advantages of the present invention will be understood by reading the following detailed description in conjunction with the drawing, in which.

In the figures and text abbreviations and indices are defined as:
u=forward wave traveling from master to slave
v=backward wave traveling from slave to master
T=communication delay
F=force
$\dot{x}$=velocity
$\ddot{x}$=acceleration
m=mass
b=wave impedance
S(s)=wave shaping element
M(s)=feedback scaling/shaping element
H(s)=high pass filter
L(s)=low pass filter
λ=bandwidth of L(s)
γ=bandwidth of H(s)
s/(s+γ) implementation of H(s)
λ/(s+λ) implementation of L(s)
I=Inertial element
R=Resistive element
C=Capacitive element
B=Damping term
K=Spring term
s=Laplace operator
$S_e$=Effort source
GY=Gyrator element
η=perception band scale factor (any positive number where 1 could be considered normal or any value ranging from 0 to 100)
Subscripts are used and defined as:
m=master
s=slave
h=hand
env or e=environment (except in $S_e$)
eq=equivalent
c=controller
f=filtered
p=proportional term
d=derivative term Combinations of subscripts are used and combine the individual terms like e.g. mc is master-controller.

DETAILED DESCRIPTION OF THE INVENTION

Human Perception and Sensor Selection

As humans, we interact with our environment in a very asymmetric manner. While the bandwidth of human movements is limited to under 10 Hz, forces from DC to 1 kHz are important for our perception of the environment. We intentionally use motions such as tapping, stroking, and scratching that elicit high frequency cues for perceiving properties such as hardness and texture.

Figure 1:
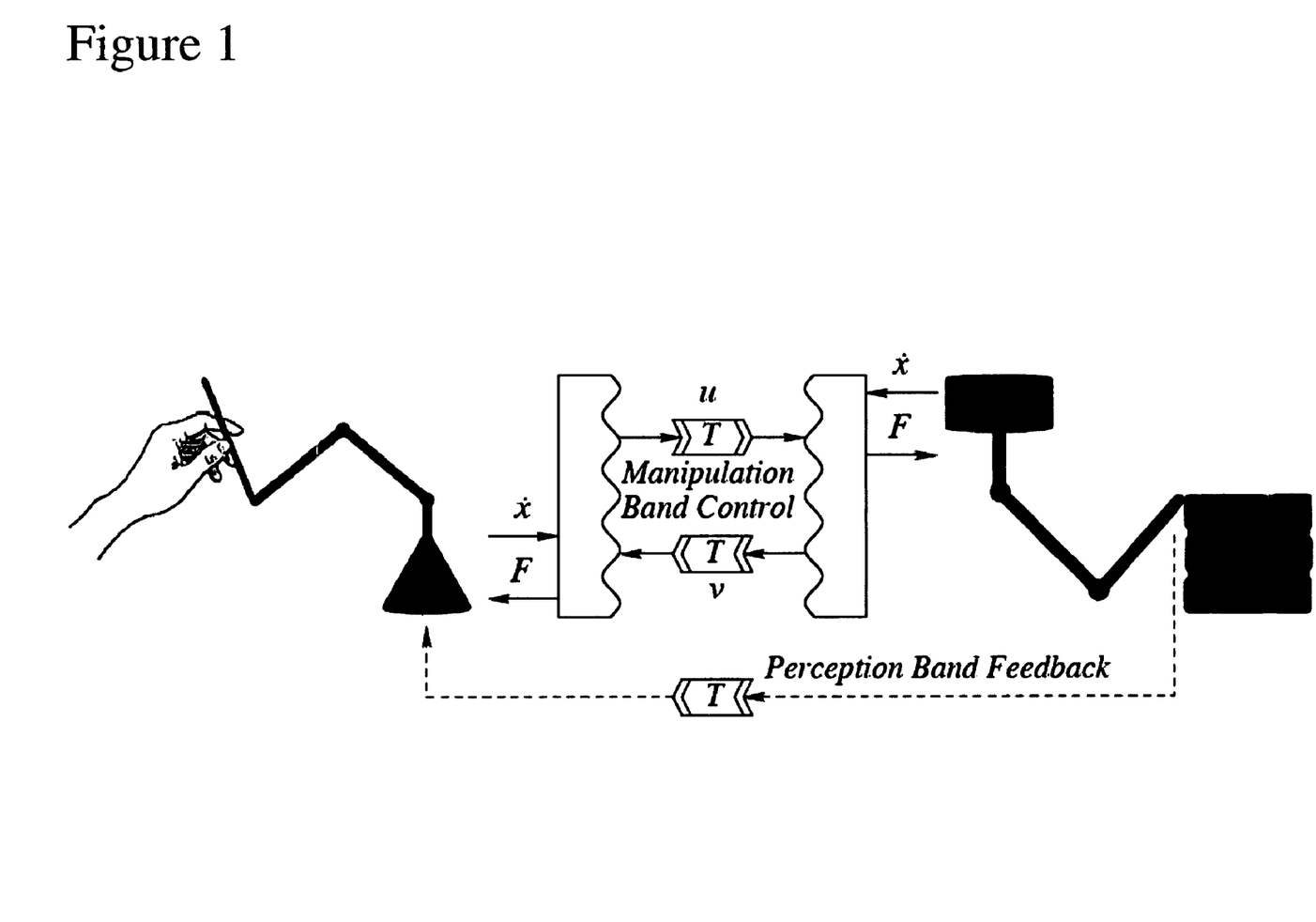
FIG. 1 shows that interactions may be separated into a bidirectional manipulation band and a unidirectional perception band.

We can thus separate interactions with an environment into two discrete frequency bands as shown in FIG. 1; i.e. a manipulation band and a perception band. The manipulation band includes the low frequency range up to approximately 10 Hz. It is fundamentally bidirectional, containing both motion (position and velocity) and force signals. The perception band is unidirectional and includes frequencies above 10 Hz up to about 1 KHz.

Augmented Wave Controller

Recognizing the inherent stability of a low bandwidth passive controller and the perceptual importance of high frequency feedback, the present invention provides a controller that will combine both of these concepts. The augmented wave controller shown in FIGS. 2-3 incorporates high frequency information from a slave tip accelerometer (FIG. 2) or a force sensor at the slave side (FIG. 3) into a passive wave controller. The augmented controller retains the bidirectional low frequency manipulation band connection and adds a unidirectional high frequency perception band feedback path using the acceleration or force information. The examples provided describe an individual degree of freedom, modeling the master and slave devices as pure masses $m_m$ and $m_s$ respectively.

Figure 2:
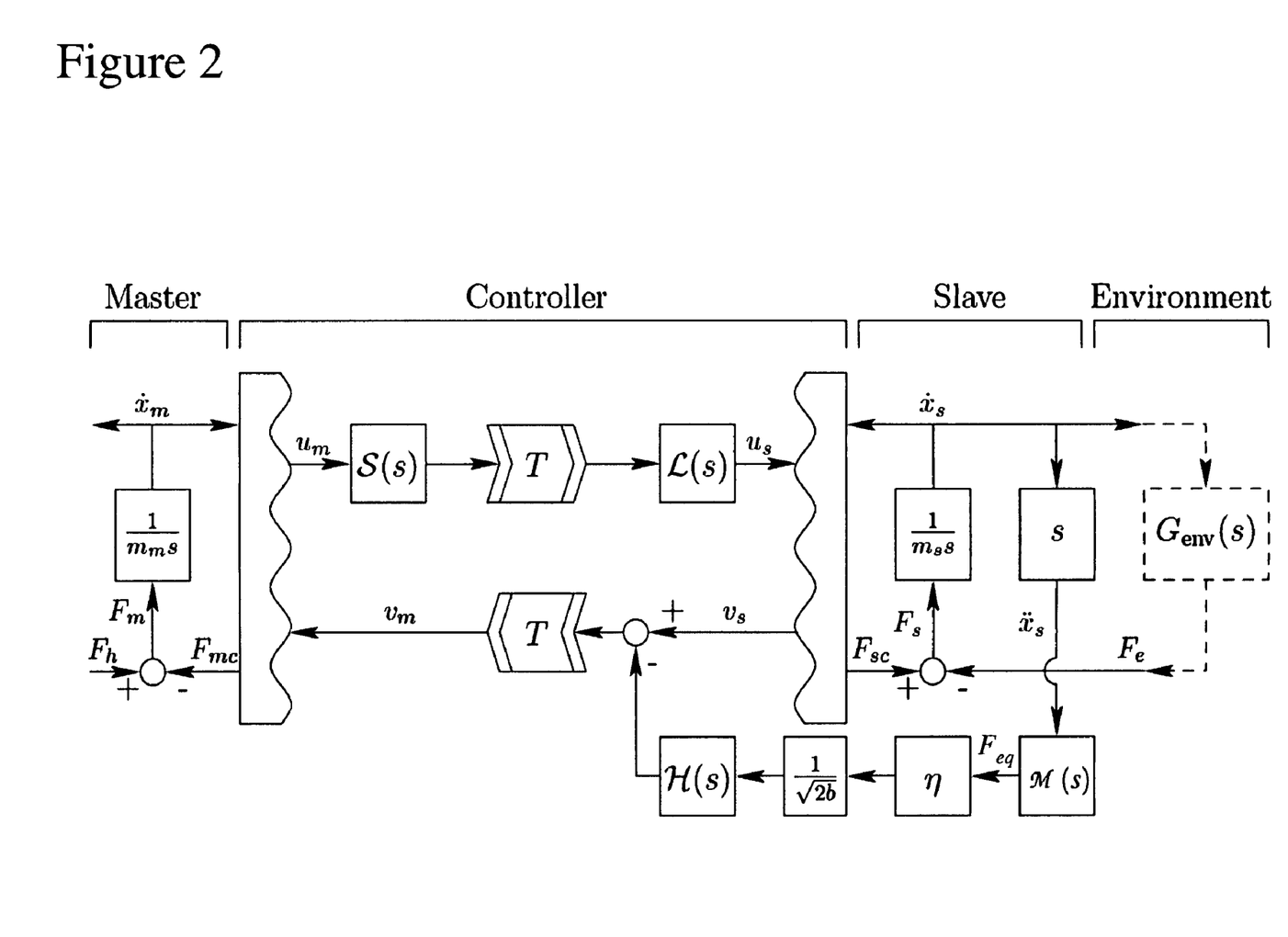
FIGS. 2-3 show each a block diagram representation of an augmented wave controller according to the present invention.
Figure 3:
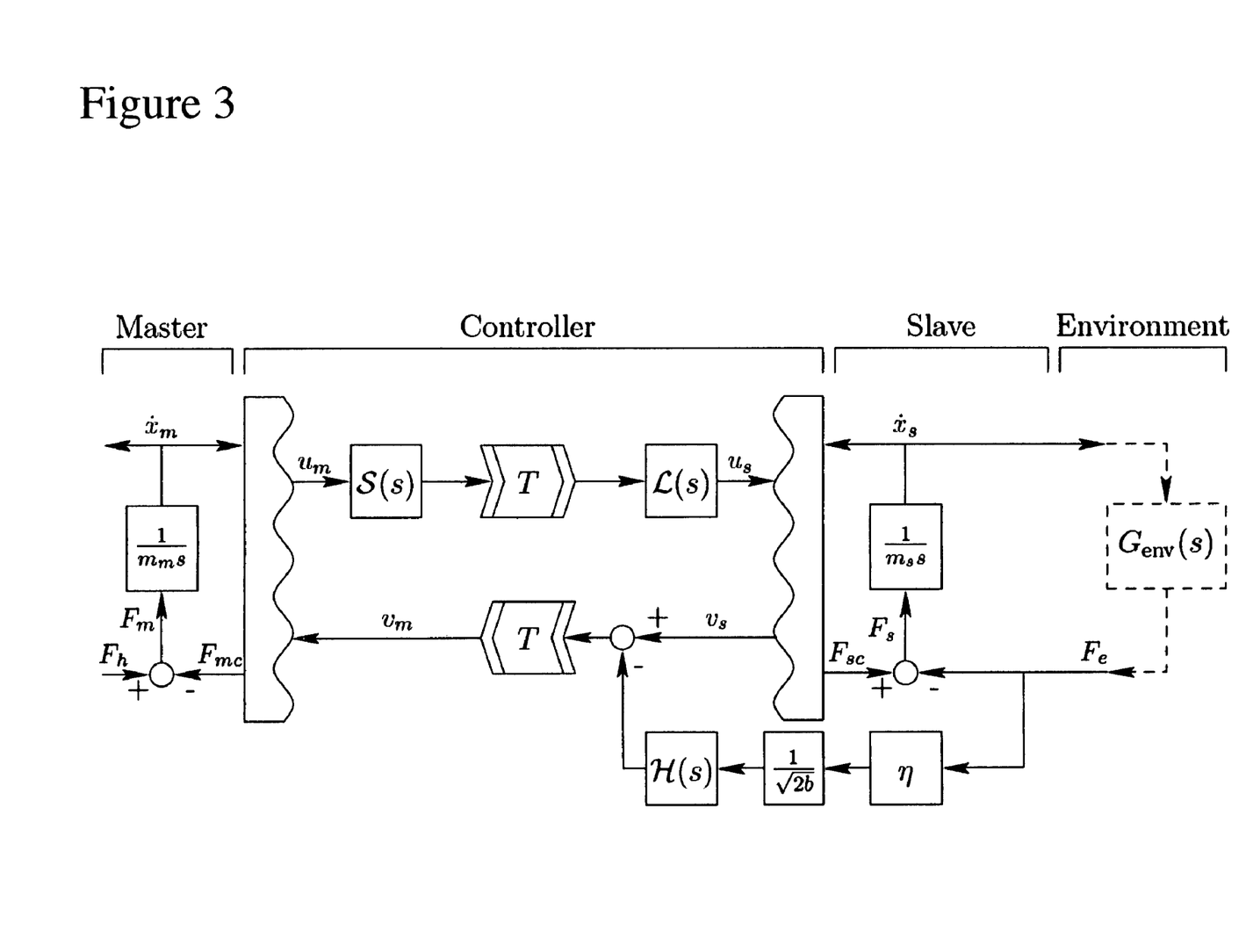

At both the master and slave locations we utilize the wave transformation to compute a force command, which is applied directly to the devices, according to $$F_{mc} = b\dot{x}_m - \sqrt{2b}\, v_m \quad F_{sc} = -b\dot{x}_s + \sqrt{2b}\, u_s$$

These force commands provide local velocity feedback as part of the wave transformation. The energy removed by this term drives the wave signals and is returned with the incoming wave so that the system does not feel damped. Using the wave transformation to compute forces eliminates the need for further control elements and provides the most direct coupling between the master and slave.

Alternatively, the wave command can be decoded into a desired velocity, which is followed by a local tracking controller.

In addition to the regular feedback path, the slave tip acceleration $\ddot{x}$, or environment force $F_e$ is measured explicitly by an accelerometer or force sensor respectively and the high frequency portion of the signal is incorporated into the returning wave after passing through a shaping process.

In the example of FIG. 2, slave tip acceleration is incorporated into the returning wave after passing through a scaling element M (s) and a high pass filter H (s). A final shaping by the wave impedance $1/\sqrt{2b}$ matches the signal against the units of the wave variables.

The slave acceleration $\ddot{x}_s$ is routed through the element M (s) to obtain an equivalent force $F_{eq}$ that is eventually applied to the master motors. The transfer function M (s) maps acceleration to force and hence carries the units of mass. For one to one scaling between the environment force and the master force, M (s) is set to the mass of the slave $m_s$. To match accelerations in the perception band between the master and slave, M (s) needs to equal the mass of the master $m_m$. Assuming a more complete model of the master device we can further improve perception by matching acceleration of the slave end effector and the user's fingertips. In this case, M (s) would invert the dynamic relationship between master motor force and master handle acceleration. It would counteract any high frequency distortion from the master's internal dynamics to more closely tie the user to the environment.

The equivalent force $F_{eq}$ is processed by a high pass filter H (s) to isolate the perception band signals and avoid interference between the two feedback paths. Nevertheless, the additional feedback path injects high frequency energy into the system and violates passivity. While the extra energy is desired for feedback, we must ensure it remains unidirectional and cannot create a closed-loop instability. As such, a low pass filter L (s) is placed in the forward wave path to dissipate any reflected high frequency energy. By tuning L (s), H (s), and M (s) appropriately, we can balance energy amplification and dissipation to ensure system stability. The end result is an asymmetric controller designed to match the interaction requirements of the user.

Augmentation based upon a force sensor, as shown in the example of FIG. 3, follows the same steps as those used with an accelerometer with the exclusion of the shaping element M (s). Here, $F_e$ is measured directly and then routed through the remainder of the scaling and shaping elements. One additional implementation uses the same scaling and shaping concepts discussed supra but applies the high frequency feedback directly to the master device, without formally integrating it into the wave channel.

While this description so far has focused to the case where unity force and position scaling are desired between master and slave within the manipulation band, extension to scaled teleoperation applications would be readily understood by one skilled in the art.

To ensure stability of the augmented wave controller, the elements L (s), H (s), and M (s) must be tuned appropriately. Specifically, these elements are typically tuned to result in the two-port including the master, slave, and controller satisfying LLewellyn's criterion for unconditional stability. A preferred implementation uses $$M(s) = m_s,$$

$$\mathcal{L}(s) = \frac{\lambda}{s+\lambda} \text{ where } \lambda = \frac{b}{m_s}, \text{ and}$$

H(s) as one of the following options:

$$\mathcal{H}(s) = \frac{s}{s+\lambda} \text{ where } \gamma = \lambda$$

for accelerometer based architecture.

$$\mathcal{H}(s) = \frac{s^2}{(s+\lambda)^2} \text{ where } \gamma = \lambda$$

for force sensor based architecture.

$$\mathcal{H}(s) = \frac{s}{s+2\lambda} \text{ where } \gamma = 2*\lambda$$

for force sensor based architecture with improved performance and a less rigorous stability proof.

Shaping Wave Reflections

Wave reflections are known to occur in the transmission element of telerobotic system and can pose significant distractions to the operator. They may be understood in the context of undamped resonances or standing wave phenomena. The traditional wave transmission allows passive bidirectional signal transmission and creates a lossless communications element regardless of delay. It stores the energy associated with the wave signals for the duration of their transmission and displays both inertial and spring-like aspects, with associated kinetic and potential energy. As such, a system based on the wave transmission may be interpreted as an undamped oscillator, with a natural frequency approximately inversely proportional to the delay time. The wave reflections are thus the response of this oscillator to user inputs.

An alternate interpretation is based on standing wave phenomena, where reflections on boundaries can superimpose and interfere constructively to create sustained oscillations. Similar to standing wave phenomena, the particular boundary conditions determine the exact resonant frequency. Irrespective of their interpretation, wave reflections can disorient the user and their slow decay may force the user to wait considerable time before resuming operations.

For small delays, this resonance can be suppressed with a simple low-pass filter in the forward wave path. With slightly longer communication delays, in the 100 ms range, the wave reflection resonance occurs at a low enough frequency that compensation with a simple low pass filter begins to limit the manipulation bandwidth of the system. To focus additional damping more effectively at the resonant frequency of the wave channel, the invention further provides shaping the waves such that the wave reflections cancel at this frequency.

Figure 4:
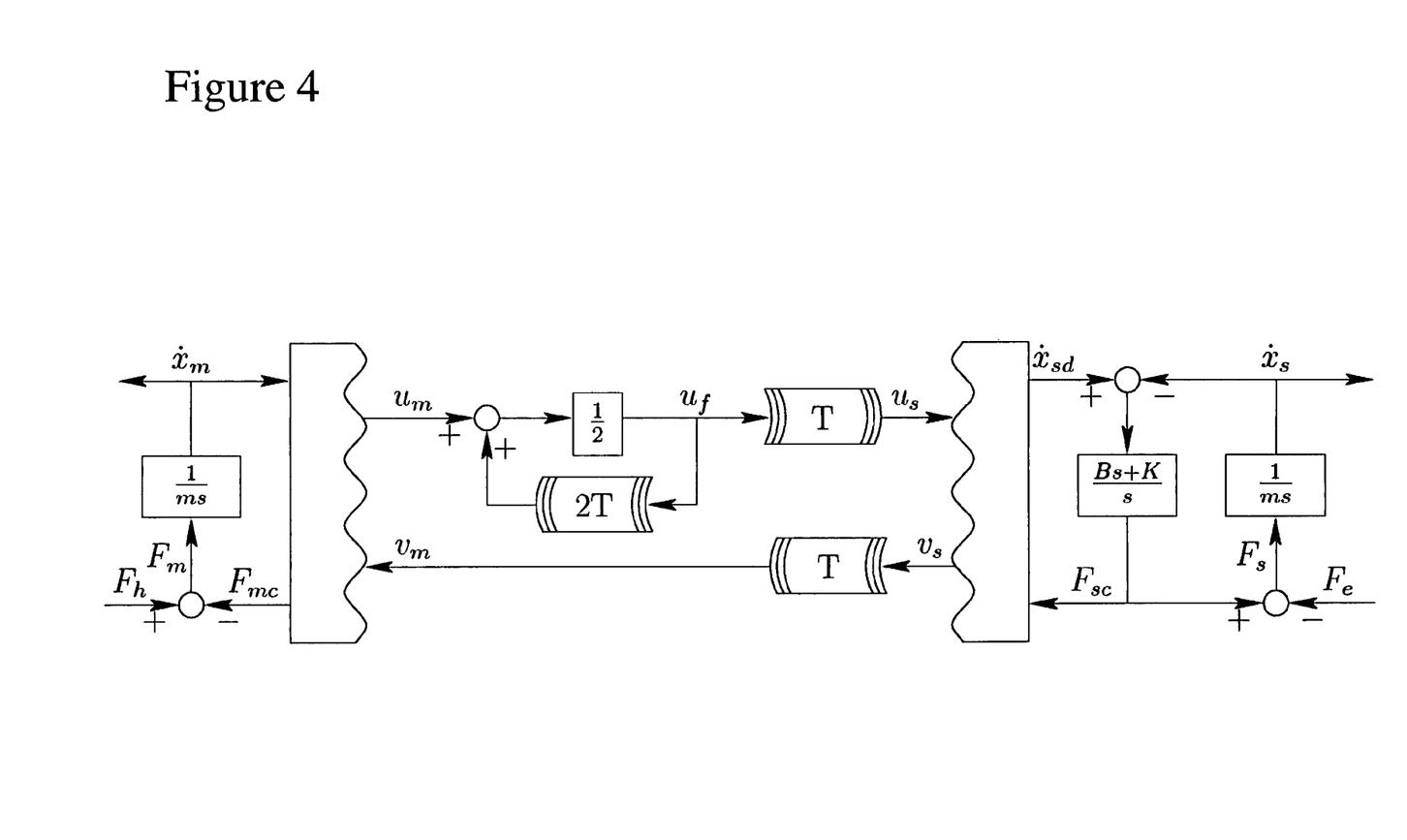
FIGS. 4-5 show each a block diagram representation with wave shaping according to the present invention.
Figure 5:
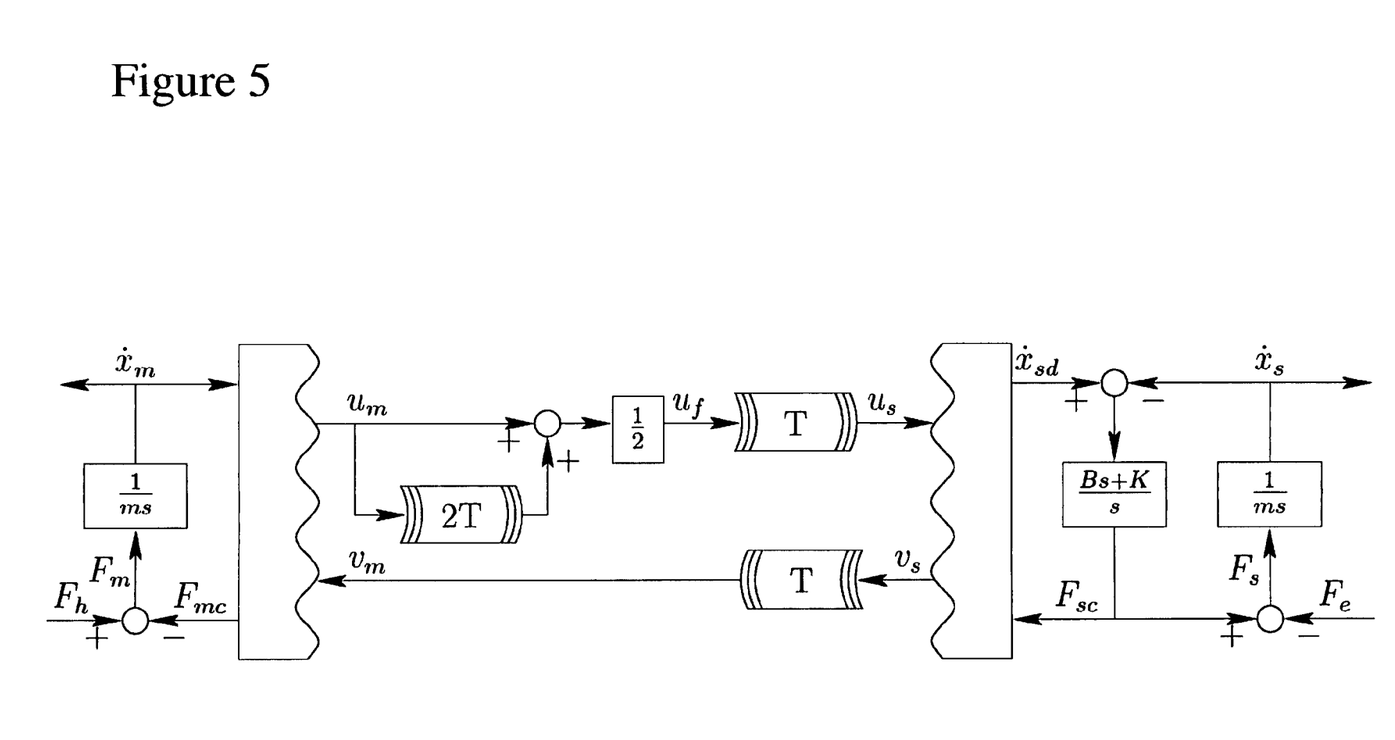

We examined both infinite horizon and finite horizon wave shaping filters (FIGS. 4-5). In the infinite horizon wave shaping in FIG. 4, the wave command is halved but also recycled and reintroduced into the system after an additional delay of 2 T. FIG. 5 shows a block diagram for the finite horizon wave shaping that delays half of the commanded wave an additional 2 T before it is sent to the slave. Both of these wave shaping schemes can still be viewed as wave filters. They are just slightly smarter filters that place more of the damping where it is actually needed and less where it is not. The transfer functions for these two filters are given as $$G_{infinite}(s) = \frac{1}{2-e^{-2sT}} \quad G_{finite}(s) = \frac{1+e^{-2sT}}{2}.$$

The magnitude portions of the bode plots show that both of these filters attenuate at the resonant frequency of the wave reflection and it's harmonics.

One advantage of wave shaping filters over a traditional notch filter is that the designer does not need to know the actual value of the time delay. The required additional 2 T delay can easily be generated by sending the commands on one extra round trip to the slave site and back through the normal communication channel. Assuming that this extra data bandwidth does not adversely affect the communication channel, this will result in a filter that automatically tunes itself to the wave reflection resonance.

Both of these wave shaping filters showed promising results for damping the wave reflection resonance for delays up to several hundred milliseconds. Allowing more of the manipulation band commands through the forward path than a low pass filter at these delays, the user benefits from better tracking and a less sluggish feel. DC components of wave reflections are returned to the user and generate appropriate steady state behavior.

Stabilization Control Through Gyration

Working in wave space provides the designer with the opportunity to easily and intuitively manipulate power flows and analyze passivity. However, most people have developed much more experience and intuition in the more commonly used power variables. By expanding the wave transformations and solving the wave loop algebraically, we are able to write the augmented wave controller with a particular selection of filters in power variables as $$F_{sc} = \frac{2b\lambda}{s}\Delta\dot{x} + b\Delta\dot{x} - b\dot{x}_m + \frac{\lambda}{s+\gamma}F_e$$

$$F_{mc} = \underbrace{\frac{2b\lambda}{s}\Delta\dot{x} + b\Delta\dot{x}}_{PD} - \underbrace{\frac{b\dot{x}_s}{GY}}_{GY} + \underbrace{\frac{\lambda}{s+\gamma}F_e}_{LF\,F_e} + \underbrace{\frac{s}{s+\gamma}F_e}_{HF\,F_e}$$

where the relative velocity of the devices is written as $$\Delta\dot{x} = \dot{x}_m - \dot{x}_s.$$

At this point it should be noted that while the augmented wave controller expressed in wave variables is tolerant to arbitrary communication delays, the augmented controller represents only the special case of no delay and does not retain the provable tolerance to delay.

Examining this augmented controller we see that the first two terms represent a traditional PD controller with gains $K_p=2b\lambda$ and $K_d=b$. However, the third term in the controller clearly distinguishes this design from traditional approaches. It does not provide damping, but instead a gyroscopic force (GY) connecting the two devices. This force transfers power between master and slave without dissipating energy and is inherent to the wave design. It is one of the sources of the augmented wave controller's asymmetry and highlights how designs in wave space can result in new control architectures.

Continuing to combine aspects of both position-position (pos-pos) and position-force (pos-force) architectures, the LF $F_e$ term applies the low frequency portion of the environment force to both the master and slave with a DC gain of one half (for $\gamma=2\lambda$). This effective low frequency force control renders the environment to the user with twice the DC stiffness of the PD terms alone. The controller's most noticeable asymmetry arises from the high frequency environment forces fed to the user in the final term of $F_{mc}$, i.e. HF $F_e$.

Figure 6:
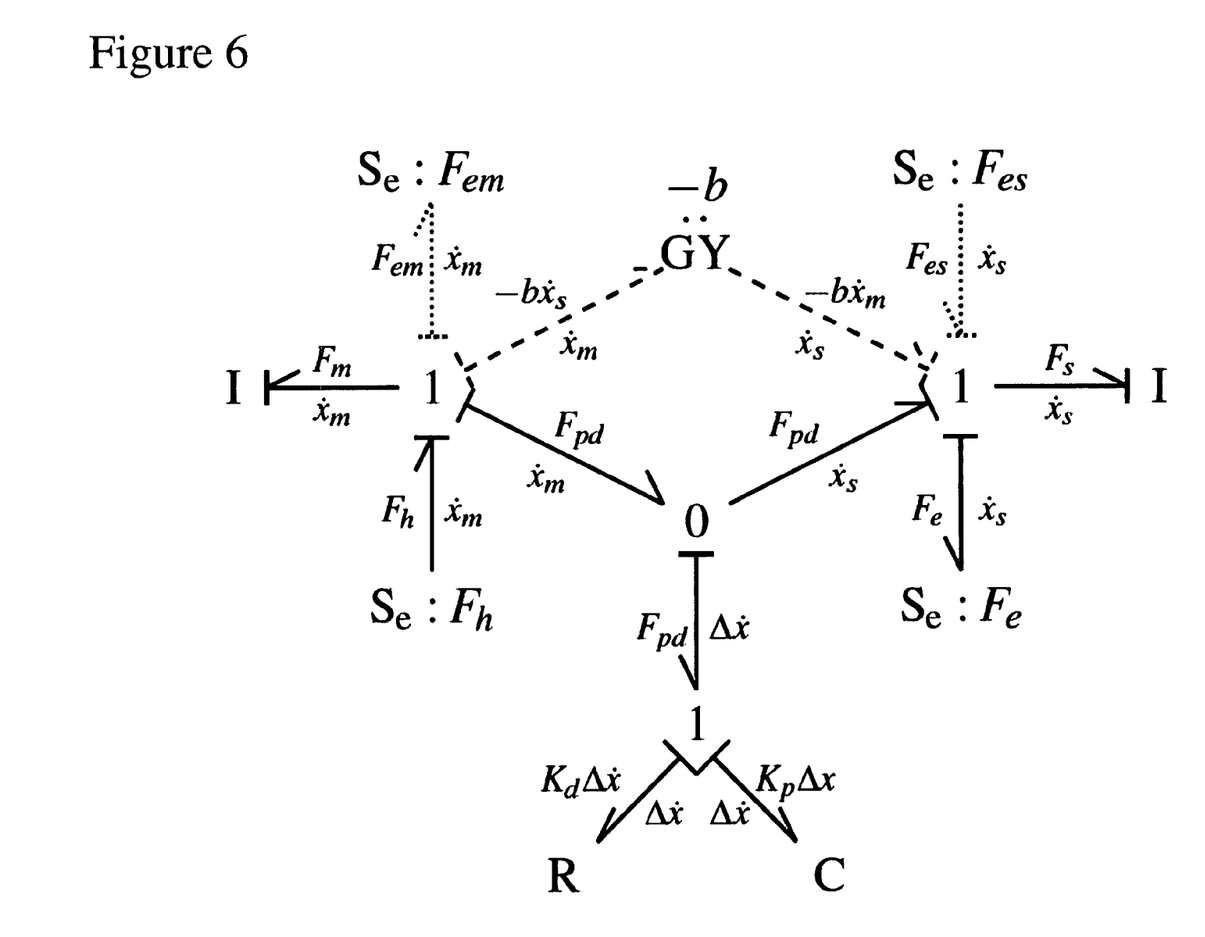
FIG. 6 shows a bond graph representation of the augmented wave controller according to the present invention.

To examine power flows in this expression of the augmented wave controller, we construct its bond graph model in FIG. 6. The bonds drawn in sold lines represent the embedded traditional PD controller. With the exception of the human user, this network represents an interconnection of passive elements and is therefore itself passive. The addition of the dashed bonds through the gyrator provides a second path for energy to flow between the master and slave that parallels the PD elements. While not a familiar element in force feedback controllers, a gyrator conserves power and preserves the passivity of the network. Accordingly, the addition of the gyrator alone does not significantly alter the high frequency transmission characteristics of the controller.

To improve the high frequency force rendering of the controller, we connect the dotted bonds to effort sources carrying the measured environment forces that are applied to the master and slave. According to the augmented wave controller expressed in power variables, these effort sources are computed by the controller as $$F_{es} = \frac{\lambda}{s+\gamma}F_e$$

$$F_{em} = \frac{\lambda}{s+\gamma}F_e + \frac{s}{s+\gamma}F_e$$

These bonds represent the possibility of injecting or absorbing arbitrary amounts of energy into the system and are one of the basic causes of non-passivity and contact instabilities that often arise in traditional pos-force architectures.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. Controller performance, passivity analysis, contact stability analysis and other details are described in the various appendices filed with the provisional application to which this application claims the benefit from. As indicated supra the provisional application with its appendices are hereby incorporated by reference in its entirety. All such variations are considered to be within the scope and spirit of the present invention as defined by the following claims and their legal equivalents.

What is claimed is:

1. A telerobotics system having a master device (m), a slave device (s) and a wave controller interfacing said master (m) and said slave device (s), wherein said wave controller is characterized by the methods steps, comprising:
 (a) said wave controller transmitting an incoming wave command ($U_s$) to said slave device (s);
 (b) said wave controller producing a wave information ($V_s$) by combining said incoming wave command ($U_s$) with received position ($X_s$) or velocity information ($\dot{X}_s$) from said slave device (s);
 (c) said wave controller producing a wave command ($V_m$) by combining said wave information ($V_s$) with a force or acceleration information (output of H(s)) from respectively the contact between said slave device (s) and the environment (e) or the tip of said slave device (s); and
 (d) said wave controller transmitting said wave command ($V_m$) to said master device (m).

2. The method as set forth in claim 1, further comprising a wave filter to shape or cancel wave reflections in said wave controller.

3. The method as set forth in claim 1, wherein said wave controller processing said wave information ($V_s$) to contain low frequency information, wherein said low frequency information has a frequency content up to about 10 Hz.

4. The method as set forth in claim 1, wherein said force or acceleration information is high frequency force or acceleration information with a frequency content of about 10 Hz or higher or of about 10 Hz to about 1 Khz.

5. The method as set forth in claim 1, wherein said acceleration information is high frequency acceleration information and wherein said method further comprises shaping said high frequency acceleration information by matching the acceleration between said master (m) and said slave device (s) in the high frequency range.

* * * * *